US00RE34203E

United States Patent [19]

Palazzo

[11] E Patent Number: Re. 34,203

[45] Reissued Date of Patent: Mar. 30, 1993

[54] DOUBLE WALL STORAGE TANK AND METHOD OF MAKING SAME

[76] Inventor: David T. Palazzo, P.O. Box 290676, Tampa, Fla. 33687

[21] Appl. No.: 639,914

[22] Filed: Jan. 10, 1991

Related U.S. Patent Documents

Reissue of:

[64] Patent No.: 4,817,817
Issued: Apr. 4, 1989
Appl. No.: 194,387
Filed: May 16, 1988

U.S. Applications:

[60] Continuation-in-part of Ser. No. 105,881, Oct. 7, 1987, Pat. No. 4,780,946, and a continuation-in-part of Ser. No. 105,890, Oct. 7, 1987, Pat. No. 4,780,947, which is a continuation-in-part of Ser. No. 43,634, Apr. 28, 1987, Pat. No. 4,744,137, which is a division of Ser. No. 884,481, Jul. 11, 1986, abandoned, which is a continuation-in-part of Ser. No. 775,140, Sep. 12, 1985, Pat. No. 4,640,439, which is a continuation-in-part of Ser. No. 818,258, Jan. 18, 1986, Pat. No. 4,644,627.

[51] Int. Cl.[5] ..... B65D 25/18; B65D 87/24

[52] U.S. Cl. ..... 220/445; 220/453; 220/457; 220/469; 220/420

[58] Field of Search ..... 220/445, 453, 457, 469, 220/420, 455; 29/455.1; 73/49.2 T

[56] References Cited

U.S. PATENT DOCUMENTS

| | | | |
|---|---|---|---|
| 3,848,765 | 11/1974 | Dürkop | 220/9 A |
| 4,523,454 | 6/1985 | Sharp | 73/49.2 T |
| 4,524,609 | 6/1985 | Sharp | 73/49.2 |
| 4,537,328 | 8/1985 | Keesee et al. | 220/445 |
| 4,625,892 | 12/1986 | Carlin, Jr. | 220/469 |
| 4,640,439 | 2/1987 | Palazzo | 220/445 |
| 4,651,893 | 3/1987 | Mooney | 220/445 |
| 4,655,367 | 4/1987 | Palazzo | 220/420 |
| 4,744,137 | 5/1988 | Palazzo | 220/445 |
| 4,780,946 | 11/1988 | Palazzo | 220/445 |
| 4,780,947 | 11/1988 | Palazzo | 220/445 |
| 4,817,817 | 4/1989 | Palazzo | 220/445 |
| 4,819,821 | 4/1989 | Sharp | 220/5 A |
| 4,844,287 | 7/1989 | Long | 73/49.2 T |
| 4,859,262 | 8/1989 | Sharp | 220/469 |
| 4,871,078 | 10/1989 | Sharp | 73/49.2 T |
| 4,885,880 | 12/1989 | Sudrabin et al. | 220/453 |
| 4,913,310 | 4/1990 | Sharp | 220/445 |
| 4,927,050 | 5/1990 | Palazzo | 220/445 |
| 4,951,844 | 8/1990 | Sharp | 220/469 |
| 4,974,739 | 12/1990 | Gelin | 220/469 |
| 5,000,342 | 3/1991 | Sharp | 220/445 |

FOREIGN PATENT DOCUMENTS

| | | | |
|---|---|---|---|
| 2658111 | 7/1978 | Fed. Rep. of Germany | 220/457 |

*Primary Examiner*—Stephen P. Garbe
*Assistant Examiner*—S. Castellano
*Attorney, Agent, or Firm*—Pettis & McDonald

[57] ABSTRACT

A double wall tank for the storage of liquids is manufactured from a rigid single wall inner tank by applying to at least a portion of the exterior surface of the inner tank a release agent for preventing bonding of a curable synthetic resin to the inner tank exterior surface, applying over the inner tank exterior surface and the release agent a substantially rigid outer sheath of a curable synthetic resin that, when cured, is substantially fluid tight, and breaking engagement between the inner tank exterior surface and outer sheath.

10 Claims, 1 Drawing Sheet

DOUBLE WALL STORAGE TANK AND METHOD OF MAKING SAME

Matter enclosed in heavy brackets [ ] appears in the original patent but forms no part of this reissue specification; matter printed in italics indicates the additions made by reissue.

RELATED APPLICATION

This application is a continuation-in-part eof applications Ser. No. 105,881, U.S. Pat. No. 4,780,946 and Ser. No. 105,890, U.S. Pat. No. 4,780,947 filed Oct. 7, 1987, which applications are a continuations-in-part of application Ser. No. 043,634, filed Apr. 28, 1987, U.S. Pat. No. 4,744,137, which application is a division of application Ser. No. 884,481, filed July 11, 1986, now abandoned, which application is a continuation-in-part of application Ser. No. 775,140, filed Sept. 12, 1985, and issued as U.S. Pat. No. 4,640,439 and of application Ser. No. 818,258, filed Jan. 18, 1986 and issued as U.S. Pat. No. 4,644,627, both entitled Double Wall Storage Tank and Method of Making Same and filed in the name of David T. Palazzo.

FIELD OF THE INVENTION

This invention relates to a double wall tank for the storage of liquids and an improved method of making such a double wall storage tank.

BACKGROUND OF THE INVENTION

Tanks for the storage of liquids have been constructed in a variety of ways from a variety of materials. In one common application, the underground storage of hydrocarbons, such as gasoline and other petroleum products, the tanks have conventionally been fabricated out of steel or fiberglass, most commonly with a single rigid wall. In many applications this construction has proved reasonably satisfactory, with such tanks functioning properly for many years before requiring repair or replacement. However, the increasing age of many of the tanks currently in place is beginning to present serious environmental dangers. Many of the older steel tanks buried underground have rusted and are beginning to leak, thus releasing the petroleum materials into the ground where they may seep into and pollute underground water supplies. While rustproof, some fiberglass tanks have also exhibited leakage, causing the same problems.

One of the primary problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage.

Because of the increasing potential danger of leaking storage tanks, particularly in communities that utilize ground water for public consumption, many municipalities have implemented or plan to implement ordinances requiring the use of double wall storage tanks underground and requiring replacement of existing single wall tanks. While the installation of a conventional double wall tank in a new facility entails no great difficulty and a generally manageable increase in cost over a single wall tank, the burden of complying with such ordinances by replacing existing sound, single wall tanks with double wall tanks can be heavy. This burden has promoted the search for methods of fabricating relatively inexpensive double wall tanks. This burden has also given impetus to the search for a method of remanufacturing existing single wall tanks into a double wall assembly with means for detecting the presence of any leaks into the space between the two walls.

A number of techniques have been disclosed for converting single wall tanks into double wall tanks and providing such tanks with the means for detecting the presence of leaks. Such methods are shown for example in my U.S. Pat. Nos. 4,640,439, 4,644,627 and 4,655,367 as well as my copending applications Ser. Nos. 046,634, 105,881 and 105,890. Although these techniques provide for quite acceptable double wall tanks they require the employment of a perforated spacing material such as mesh, or alternatively, a molded spacing material that must be constructed and applied to the inner tank. The labor and time involved in constructing and installing these spacing materials can be significant, and the need exists to reduce even further the cost of producing such double wall tanks.

SUMMARY OF THE INVENTION

In view of the foregoing it is an object of the present invention to provide an improved economical method of manufacturing a double wall storage tank from a single wall tank by providing an outer sheath enclosing the single wall tank.

It is a further object of this invention to provide such a method in which at least a portion of the outer sheath of the tank is free of engagement with the outer surface of such inner tank.

To achieve these and other objects that will become readily apparent to those skilled in the art, this invention provides a method of manufacturing a double wall tank for storage of liquids from a single wall inner tank. The method includes the step of applying to at least a portion of the exterior surface of the rigid inner tank a release agent for substantially preventing bonding to that inner tank exterior surface, applying over that inner tank exterior surface and that release agent a substantial rigid outer sheath of a curable synthetic resin that, when cured, is substantially liquid-tight, and then breaking engagement between the inner tank exterior surface and the outer sheath, whereby is formed a double wall tank in which the inner tank defines an inner wall and the outer sheath defines an outer wall.

In a preferred embodiment, the engagement of adhesion between the outer sheath and the inner tank is broken by applying a fluid under pressure between the inner surface of the outer sheath and the exterior surface of the inner tank. This invention further provides a double wall tank apparatus that includes an outer sheath applied over the inner tank and includes means for applying a fluid under pressure between the inner tank exterior surface and the outer sheath sufficient to break any adhesion between the outer sheath and the inner tank.

BRIEF DESCRIPTION OF THE DRAWINGS

Particularly preferred embodiments of the method and apparatus of this invention will be described in detail below in connection with the drawings in which.

DESCRIPTION OF PREFERRED EMBODIMENT

Figure 1:
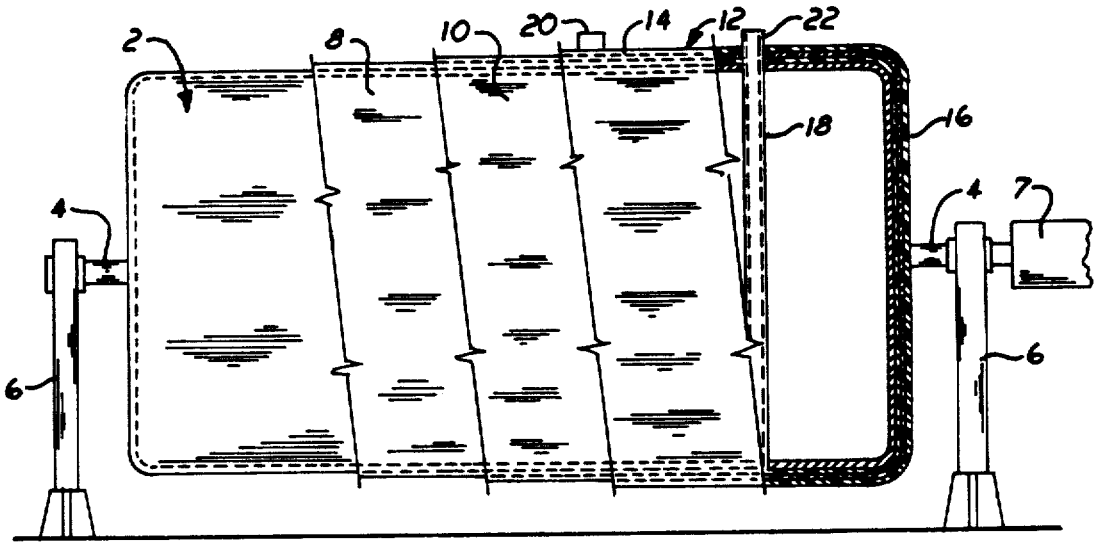
FIG. 1 is a side elevational view, partially in section, of a tank according to the present invention, illustrating various steps in the fabricating process.
Figure 2:
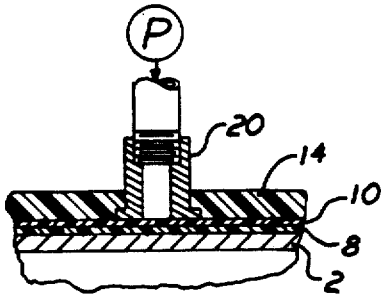
FIG. 2 is a fragmentary side sectional view of a portion of the tank according to this invention and of an apparatus and technique for breaking adhesion between the outer sheath and the inner tanks.

A preferred embodiment of the apparatus of this invention is illustrated in FIGS. 1 and 2. FIG. 1 is a side elevational view illustrating the manner of making the completed tank assembly by the application of the various materials to the storage tank.

While various forms and shapes of tanks may be utilized in practice of this invention, the most common shape utilized for underground storage is that of a cylinder, generally a right circular cylinder, having closed end portions. For simplicity of illustration this configuration of tank is utilized for illustrating the preferred embodiment of the invention. Also, while virtually any construction of the rigid inner tank, whether of metal or fiberglass or other material, may be utilized in practicing this invention, one preferred and readily available type of structure is a tank formed of welded steel, having an appropriate corrosion resistant coating on the liquid contacting surfaces. For purposes of illustration such a steel tank will be described. It is also to be understood that the tank to be used could be a newly fabricated tank, which may or may not have any manhole opening cut in it, or it may be a previously used tank removed from it prior underground installation and cleaned for reuse with this invention.

To prepare an uncoated or a previously used steel tank, it is preferred, but not required, to simplify subsequent steps by attaching a spindle, as by welding, to the center of each tank head or end portion, generally collinear with the axis of the tank. As shown in FIG. 1, the spindles 4 and thus the inner tank 2 may then be supported off the ground on conventional uprights 6. This provides for rotation of the tank by an appropriate and conventional rotary drive 7 for purposes to be set forth below. Then it is desirable that the exterior surface of the tank be conventionally sandblasted and coated with a rust inhibitive material 8. This coating material 8 preferably may be a conventional polyester resin incorporating a known paraffin-based tack free additive known to those skilled in the art.

In the next step of the present invention a release agent, such as that known in the industry as Partall, is applied to at least a portion and preferably to the entire exterior surface of the inner tank 2. Release agent 10 is applied to the inner tank 2 by conventional techniques such as brushing or spraying as the tank is rotated to provide preferably a substantially uniform coating over the entire exterior surface of the inner tank 2, including the end portions 3 of that inner tank.

After the release agent 10 has dried, the outer sheath of the tank is applied. This outer sheath 12 may be fabricated in a number of different ways. In this preferred embodiment the rigid outer sheath 12, and particularly the cylindrical sidewall portions 14 thereof, are formed by bonding resin impregnated glass fiber matting over the release agent 10 in a conventional manner. It has been found convenient to lay sections of such glass fiber matting over the release agent coated inner tank and then apply suitable and well-known resins to that matting, although matting that is preimpregnated with resin could be used with equal facility. Likewise the application of resin and chopped glass fibers through the "chopper gun" technique may also be used. While the thickness of the outer sheath 12 may vary according to the severity of conditions anticipated, it should be of sufficient thickness to provide a substantial rigid sheath. It has been found that one-quarter inch thickness of the cured, resin impregnated glass fiber matting generally provides sufficient strength and rigidity for the sheath 12.

To form end portions 16 of the sheath, the resin impregnated glass fiber mat may simply be laid and wrapped around the tank end portions, forming a continuous structure with the cylinder sidewalls. If this technique is used, the release agent 10 preferably is continued over those end portions. This continuous application of glass fiber material may be effected with the tank still supported with spindles 4, or with those spindles cut off. If the spindles are retained, they may be cut off at a later time and a patch of appropriate resin impregnated glass fiber matting placed over the hole left by the spindle. This continuous lay-up method of forming the end portions 16 of the sheath 12 is illustrated in the partial sectional view at the right hand end of FIG. 1.

In this invention it is desirable to break, at least temporarily, the engagement between the exterior surface of the inner tank 2 and the outer sheath 12 to provide for passage of liquids between the exterior of tank 2 and the outer sheath. Accordingly, as shown in FIG. 2, a suitable fitting or other means are provided for introduction of a pressurized fluid P between the exterior surface of the inner tank 2 and the outer sheath 14. Preferably this may be accomplished by inclusion of structures, such as the fitting 20, which may conveniently include a flange on one end and a female thread, such as a pipe thread, on the other end. This fitting 20 may conveniently be placed or loosely held against the release agent coated exterior surface of inner tank 2 prior to application of the resin and glass fiber material making up outer sheath 12. Then, as that outer sheath material is applied over the inner tank 2 and its release agent 10 and around the fitting 20, that fitting will be firmly bonded in place by the outer sheath 12, as shown in FIG. 2. Upon completion of the application of the sheath material and curing of the curable resin that comprises that outer sheath 12, the fitting 20 may be firmly bonded in place.

As shown in FIG. 1, the inner tank 2 may also be provided with a tube 18 extending generally diametrically through both sides of the tank, with the lower end extending to a point closely adjacent to one cylindrical sidewall, shown as the lower portion in FIG. 1, and the opposite end shown as the upper portion 22 extending substantially above a generally diametrically opposed portion of the inner tank 2. In fabricating the outer sheath 12, the sheath may be bonded around the portion 22 in a manner generally similar that described above with respect to fitting 20. Thus, in the completed double wall tank the tube 18 extends from its portion 22 outside the sheath through the adjacent portion of the outer sheath 12 and the sidewall of the inner tank and the opposite sidewall of the inner tank, with its open lower end terminating adjacent the lower portion (FIG. 1) of the outer sheath 12.

To enable the double wall tank formed by the method of this invention to provide for the protection against leaking of fluids to be contained within it, another process step comprises breaking, at least temporarily, any engagement between the inner tank exterior surface and the inner surface of the outer sheath. This step may be performed by application of a fluid under pressure P, such as air, that is sufficient to break, at least temporarily, engagement between the inner tank exterior surface and the outer sheath. Because of the coating of the inner tank outer surface with the release agent 10, distortion or expansion of the outer sheath 12 caused by application of that fluid P under pressure, suitably through fitting 20, causes that outer sheath 12 to separate and break free from engagement with inner tank 2. The pressure required may be as little as 1 to 5 pounds per square inch over ambient, and the movement of the sheath from the inner tank under the influence of that pressure may be as small as 1/1,000 of an inch. It is only necessary to break the outer sheath from any substantial bonding to the inner tank in order to provide a path for flow of hydrocarbons between the outer sheath and the inner tank, for purposes to be described below.

Figure 3:
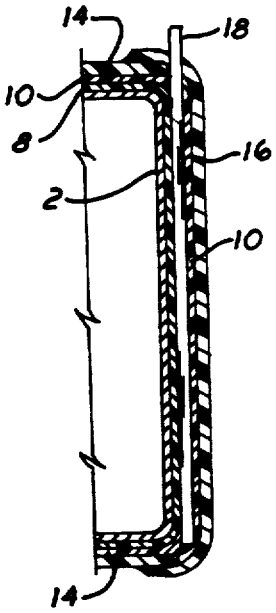
FIG. 3 is a partial side sectional view, similar to the right hand portion of FIG. 1, illustrating a different embodiment of the end structure of the tank of this invention.

As an alternate construction method, the end portions 16 of the sheath 12 may be fabricated separately from the cylindrical sidewall portion 14. Such a technique, illustrated in the fragmentary sectional view of FIG. 3, provides substantially the same end result as the continuous lay-up process shown in FIG. 1. However, this method of forming the end portions 16 separately may simplify the manufacture by permitting formation of those end caps 16 over a male mold plug, thus permitting the glass fiber material to be laid substantially horizontally instead of vertically, as is required in the continuous lay-up approach of FIG. 1.

As shown in FIG. 3 the tube 18 may, alternatively, be bonded into one, or both, of the end portions 16, extending from a point adjacent the lowermost portion of the interior of the outer sheath 12 through an aperture formed in the upper portion of outer sheath 12. In this embodiment the tube 18 extends between the inner surface of the end portion 16 of the outer sheath 12 and the exterior surface of the end wall of inner tank 2. The pressurized fluid P described above could equally well be introduced through this tube 18 in FIG. 3, or through the corresponding tube 18 illustrated in FIG. 1, instead of through fitting 20.

The remaining steps involved in the manufacture of the double wall tank of this invention may be substantially the same as those described in detail in my prior U.S. Pat. Nos. 4,640,439, 4,644,627 and 4,655,367, the teachings of which patents are incorporated herein by reference.

By the foregoing construction there is thus provided a double wall tank that can be manufactured economically from a conventional steel wall tank, and even from a used tank that has previously been removed from underground storage. This structure provides an outer sheath, which may be formed from a material that is free of any tendency to rust or corrode, and which is free from any bonding with the inner tank to permit the collection within the space between the inner tank and the outer sheath, and thus detection, of any liquids leaking into that space, either from the tank or from sources exterior to the sheath. Thus may be determined the existence of any leakage of either the tank or the sheath by simply detecting the presence and nature of any liquid present in that space. Additionally, leakage may be detected by applying a positive or negative pressure to the tank or to the space between the exterior surface of inner tank 2 and the interior of outer sheath 12 and then observing to determine if that level of pressure is maintained, all as is known in the prior art. By the use of a relatively thick and rigid outer sheath, the strength of that sheath is enhanced over similar structures that may use a flexible outer covering. Furthermore, such a rigid external sheath permits testing of the integrity of the sheath and tank at substantial pressures, which could not be done with a flexible covering without danger of rupture. As an additional desirable feature, the space between the inner and outer tanks is formed without the need for any substantially rigid spacer material, thereby saving both labor and material costs.

While the foregoing describes in detail several preferred embodiments of the tank of this invention, it is to be understood that such description is illustrated only of the principles of the invention and is not to be considered limitative thereof. Because numerous variations and modifications of both the method of manufacture and the resulting tank will readily occur to those skilled in the art the scope of this invention is to be limited solely by the claims appended hereto.

What is claimed is:

1. A method of manufacturing a double wall tank from a *rigid* single wall inner tank for storage of liquids, said inner tank including a generally cylindrical sidewall and pair of end walls, said method comprising;

applying to at least a portion of the exterior surface of said rigid inner tank a release agent for substantially preventing bonding of a curable synthetic resin to said inner tank exterior surface portion;

applying over said inner tank exterior surface and said release agent a substantially rigid outer sheath of [a] *said* curable synthetic resin that, when cured, is substantially fluid tight; and breaking engagement between said inner tank exterior surface and said outer sheath, whereby is formed a double wall tank in which said inner tank defines an inner wall and said outer sheath defines an outer wall.

2. The method of claim 1 in which said step of breaking engagement includes the step of applying between said inner tank exterior surface and said outer sheath a fluid under pressure that is sufficient to break, at least temporarily, engagement between said inner tank exterior surface and the outer sheath.

3. The method of claim 2 in which said step of applying a fluid under pressure includes the steps of connecting a fluid conduit to said double wall tank such that a discharge opening of said conduit is disposed within said outer sheath but outside said inner tank exterior surface, and introducing a pressurized fluid to said conduit to apply a positive fluid pressure between said inner tank exterior surface and said outer sheath.

4. The method of claim 1 wherein said sheath comprises at least one layer of fibrous material coated with [a] *said* curable resin which, upon curing, provides a coating which is resistant to the passage of water or hydrocarbon liquid.

5. The method of claim 1 wherein said release agent is applied to substantially the entire exterior surface of said inner tank.

6. The method of claim 1 wherein said outer sheath has a configuration generally of a cylinder with closed ends, and wherein said release agent is applied to said cylindrical sidewall, whereby the release agent will serve to prevent bonding between the outer surface of the cylindrical sidewall of the inner tank and the outer sheath.

7. The method of claim 6 wherein [the] cylindrical sidewall portions of said outer sheath overlying said inner tank cylindrical sidewall are formed separately from [the] end portions of said sheath overlying [the] closed end portions of said inner tank, and wherein said sheath end portions are sealingly joined to said sheath cylindrical [wall] *sidewall* portions, whereby is formed a continuous outer sheath overlying said inner tank.

8. The method of claim 1 further comprising the step of forming an aperture through said sheath and through a portion of a wall of said inner tank, whereby is provided access to the interior of said inner tank.

[9. A double wall tank for storage of liquids manufactured in accordance with the method of claim 1.]

10. A tank for storage of liquids comprising;

a substantially rigid inner tank having a generally cylindrical sidewall and a pair of end walls;

a substantially rigid and substantially fluid tight outer sheath enclosing said inner tank and formed of a resin impregnated fibrous material that is substantially fluid tight;

a release agent interposed between at least said inner tank cylindrical sidewall and said outer sheath to prevent bonding between said outer sheath and said [release agent coated] sidewall of said inner tank; and means for applying between the exterior surface of said inner tank and said outer sheath a fluid under a pressure that is sufficient to break engagement between said outer sheath and the exterior surface of said inner tank, whereby is formed a double wall tank in which said inner tank exterior surface defines an inner wall and said outer sheath defines an outer wall.

11. The tank of claim 10 in which said means for applying pressure includes a fluid conduit that extends through said outer sheath and has a discharge opening that communicates with the exterior surface of said inner tank and the interior surface of said outer sheath.

* * * * *